July 4, 1944.  E. H. HECKETT  2,352,712
RECOVERY AND USE OF SCRAP STEEL
Filed Nov. 24, 1941  3 Sheets-Sheet 1

Inventor
ERIC H. HECKETT
By Francis J. Klempay
Attorney

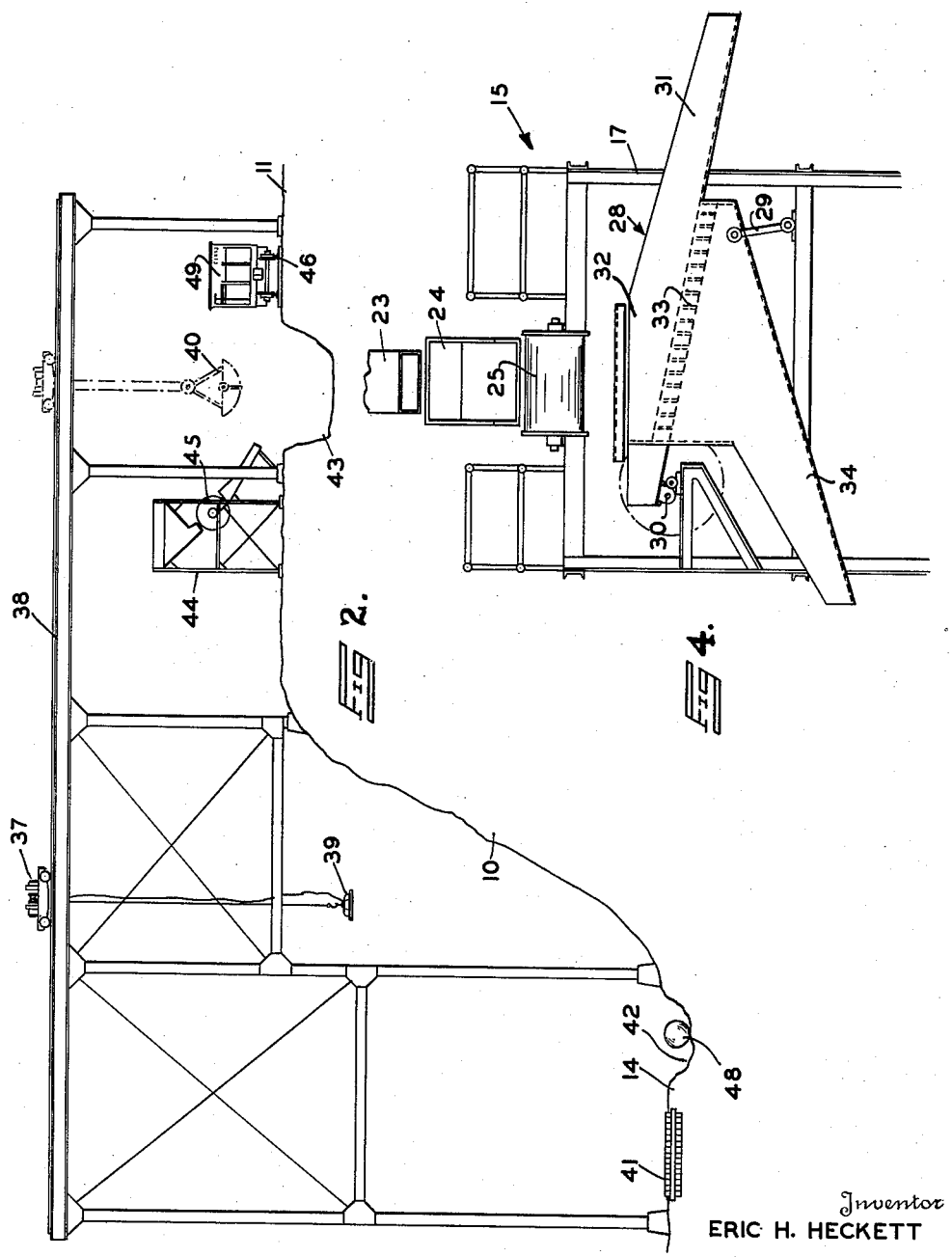

July 4, 1944.  E. H. HECKETT  2,352,712
RECOVERY AND USE OF SCRAP STEEL
Filed Nov. 24, 1941  3 Sheets-Sheet 3
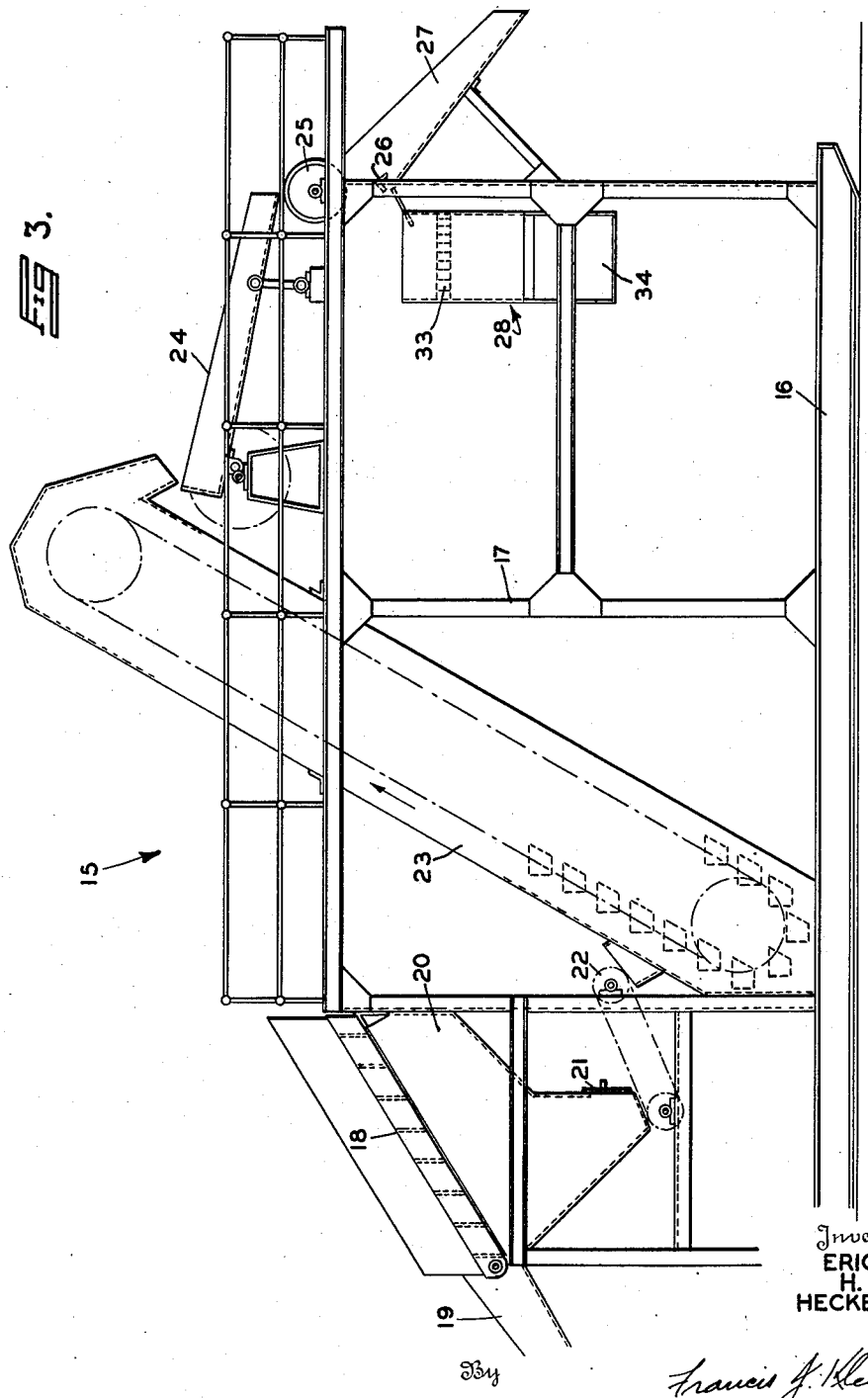
Inventor
ERIC H. HECKETT
By Francis J. Klempay
Attorney Patented July 4, 1944

2,352,712

UNITED STATES PATENT OFFICE 2,352,712

RECOVERY AND USE OF SCRAP STEEL

Eric H. Heckett, Titusville, Pa.

Application November 24, 1941, Serial No. 420,232

5 Claims. (Cl. 75—30)

This invention relates to the recovery and use of scrap steel from open hearth and Bessemer slag and refuse and more particularly to methods and apparatus for accomplishing these objectives in an economical and practical manner whereby the commercial value of the involved operations is materially increased. The invention involves also, in its broader aspects, the general operation of steel making plants utilizing either open hearth or blast furnaces or both to the end that the operational efficiency of such plants may, to some extent, be increased.

In my co-pending application Ser. No. 294,150, filed September 9, 1939, now U. S. Patent No. 2,264,204, there is disclosed and claimed a basic method of recovering free steel lumps or particles from steel-making furnace slags which method involves essentially magnetic separation of the slag as discarded by the steel mill into components rich and deficient in steel content, subjecting the first named component to an impact treatment for the purpose of breaking away the slag from the free steel lumps or particles, and thereafter magnetically re-separating the treated material to reclaim steel having the required degree of purity.

It is found that the above described process is suitable for two general types of operations, the first in which the slag and refuse from current steel mill operations is processed to recover the steel, and the second in which the slag and refuse accumulated in dumps from prior mill operations is processed to recover the steel. Varying factors enter into the practical accomplishment of these operations and it is the primary purpose of the present invention to provide an operational method and plant layout which is sufficiently flexible to enable the stated process to be practicably adapted to widely varying conditions. In the recovery of steel from slag and refuse resulting from current operations the amount of yield per ton of material processed is relatively low but the cost of processing is lower due to the elimination of the step of removing the material from the dump and the steel scrap reclaimed is of more value in the concurrent steel-making process since the analysis of the steel is known to the operators of the mill. However, as a result of less efficient operation of open hearth and Bessemer plants in years gone by the older slag dumps throughout the steel-making areas contain a large proportion of reusable scrap steel and the yield from the processing of this older material is correspondingly high. Heretofore the problems encountered in attempting to gain access to this older material and to subject this material as well as slag from current operations to a systematic processing for the specific purpose of reclaiming and reusing the free steel invested therein were considered to make the plan wholly impractical. The applicants' invention seeks to provide certain specific teachings in the construction and the layout of apparatus for the purpose stated and in the operation of such apparatus particularly in relation to the adjacent producing plant whereby the prior limitations are overcome.

Steel recovered according to the present invention is particularly adaptable for charging either the open hearth or the blast furnace. For various reasons the scrap steel used in the open hearth should have a fairly high degree of purity, i. e., the material charged should have less than 20% of entrapped slag and the individual pieces of the material should exceed 1" in minimum dimension. The smaller pieces can be satisfactorily charged in the blast furnace where the slag intermingled with the steel aids in the formation of the flux in the furnace, and the iron and manganese contained in the slag are recovered as well as the free steel attached to or mixed with it. These respective conditions are met according to the invention by separating the material into fines less than 1" or 1½" in size and larger pieces and transferring these fines direct to the blast furnace and the larger pieces to the cleaning and reseparating treatments mentioned and thence to the open hearth.

A more specific object of the invention is the provision of an improved method of handling and processing the slag and refuse in existing steel mill dumps whereby the component of reusable steel therein may be recovered in an economical and practical manner. Each scene of operations presents its own special problems of material handling and disposal. Inasmuch as the existing or any practical rail facilities interconnecting the dumping area and the steel mill are located on the upper levels of the dump, provision is made to transfer the reclaimed steel in the dump to this level. Inasmuch as a substantial proportion of the slag discarded in the course of the process may be hauled away for filling, road building etc., the first magnetic separation of the bulk of the material is effected at the base of the dump to avoid the necessity of elevating an unnecessary weight of material. A representative arrangement of facilities for accomplishing this mode of operation and the manner of operating such facilities is explained below.

The above and other specific objects and advantages of the invention will become apparent from a consideration of the following detailed specification and the accompanying drawings wherein there is specifically disclosed a representative physical embodiment of the invention. The embodiment illustrated has particular applicability in the recovery of scrap steel from existing dumps of open hearth and Bessemer slags and refuse regardless of when the material was accumulated. It should be understood, however, that the specific disclosure is exemplary only as obviously varying field conditions require different plant facilities and organization.

In the drawings:

Figure 2 is a vertical section through the plant of Figure 1, the section being taken along the line II—II of Figure 1;

Figure 3 is a side view of a unitary material separating and grading assembly utilized in the plant of Figure 1; and Figure 4 is an end view of the apparatus of Figure 3.

Figure 1:
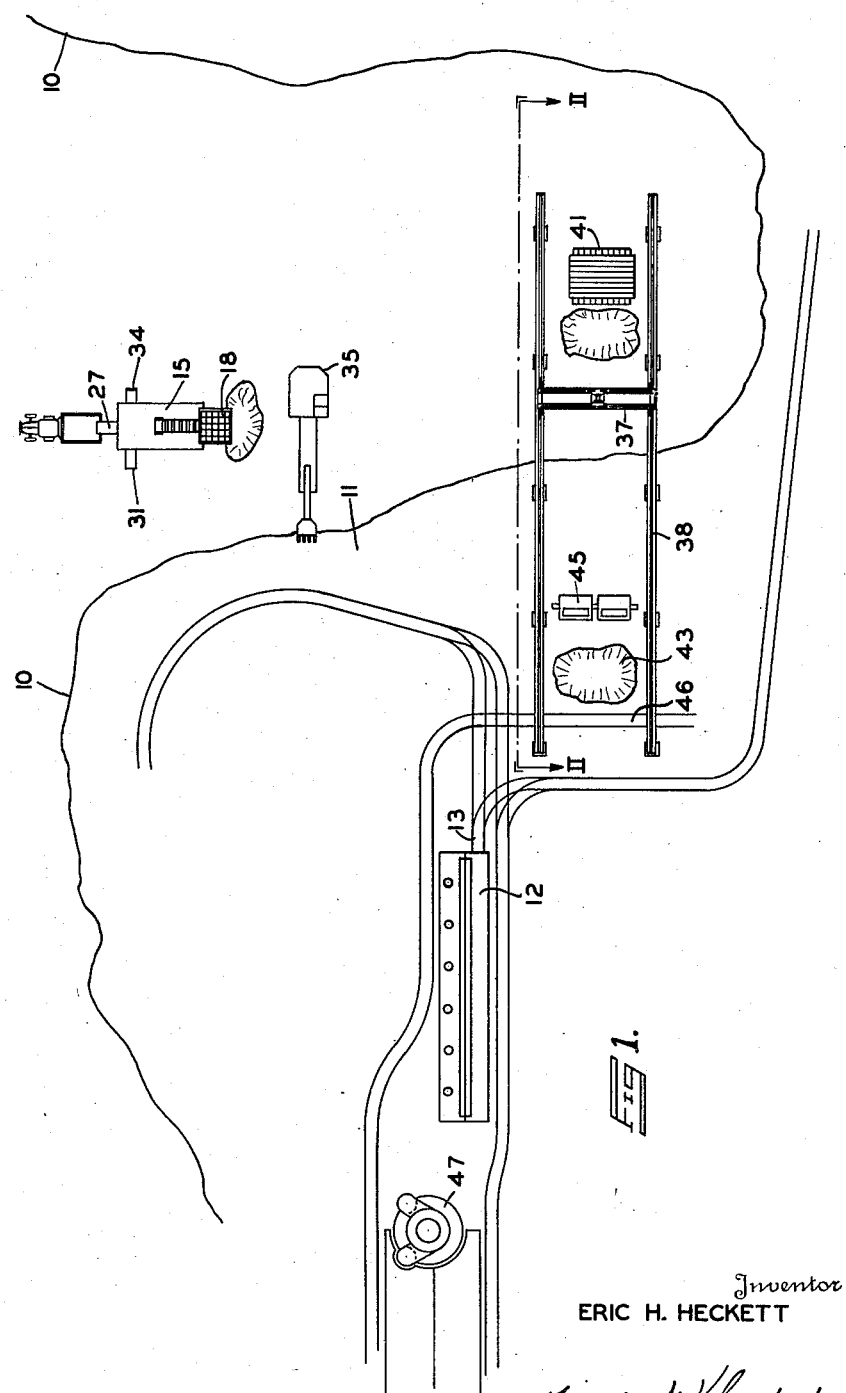
Figure 1 is a plan view of a plant constructed according to the teachings of the invention and which is of particular utility in recovering scrap steel values from an existing slag dump.

In Figures 1 and 2 reference numeral 10 indicates an existing slag dump which in accordance with usual practice is provided with an upper level 11 which is utilized to support the tracks along which the slag cars travel in building up the dump. Normally, the slag dumps are located in the vicinity of the steel-making furnaces which produce the slag to avoid the expense of a long haul for such refuse and in the drawings reference numeral 12 indicates an open hearth plan from which extends a track 13 to haul the slag to the dump. The slag dump is also provided with an existing or a presently made base level 14 on which certain of the operations of the present specifically described method takes place.

Referring now to Figures 3 and 4 which illustrate a combined material separating and grading assembly indicated generally by the reference numeral 15 it will be observed that this assembly is portable in nature, being supported on the spaced parallel skids 16, and in practice this is the preferred arrangement. Extending upwardly from the skids 16 is a framework 17 which supports in elevated position at its one end an inclined grid or "grizzly" 18 which is of heavy construction and which has openings of approximately 10 or 12 inches square. Extending downwardly and outwardly from the lower edge of the grizzly 18 is a chute 19 which deposits the large sized lumps in a pile in front of the separator assembly. Positioned below the grizzly 18 is a hopper 20 which empties through a control door 21 onto a belt feeder 22 which in turn discharges onto an elevator 23 which may be of the bucket or other variety. Elevator 23 lifts the slag lumps and particles to the top of the apparatus and discharges the same onto a shaker conveyor 24 which in turn deposits the material on the periphery of a magnetic separating roll 25. Those lumps and particles which are deficient in steel content do not adhere to the roll 25 and pass to the right (as viewed in Figure 3) of the deflecting bar 26 and into the chute 27 extending outwardly from the rear end of the separating assembly. Bits and pieces of steel whether or not slag is adhering thereto are attracted by the magnet in roll 25 and passed to the left of deflecting bar 26 into a combined shaker conveyor and grader 28 which is shown more clearly in Figure 4.

The combined shaker conveyor and grader 28 is mounted transversely of the frame 17 on rocker arms 29 and crank pins 30. This assembly includes an upper chute 31 extending downwardly and outwardly of one side of the frame 17 and having an inlet 32 adapted to receive the material deflected to the left by the bar 26. That end half of the bottom wall of the chute 31 which is adjacent the inlet 32 is composed of a screen or grid 33, the openings through which are approximately 1 or 1½ inches in size. The smaller sized material which passes through the screen 33 is accumulated in a second chute 34, also forming part of the assembly 28, which discharges on the opposite side of the separator from the chute 31.

Referring back to Figures 1 and 2 of the drawings it will be observed that at least one of the combined separating and grading units 15 is positioned on the base level 14 of the dump and is supplied by a power shovel 35 which is operative to move the slag material and refuse from the dump proper and deposits the same on the grizzly 18 of the machine 15. In this manner an initial separation is accomplished at the start of operations and the material which contains no steel is at once segregated, being discarded through chute 27. During operations the discarded material may be either hauled away for filling, road building or other purposes or deposited on the dump.

An overhead traveling crane, shown schematically at 37 in Figures 1 and 2 is provided with runways 38 extending from above a portion of the upper level 11 to above a portion of the base level 14. Crane 37 is arranged to be alternatively attached to a lifting magnet 39 and to a bucket 40 and is adapted to perform a number of operations as will appear below. Positioned on the base level 14 and within the area served by the crane 37 is a platform 41 and a pit 42 which may or may not be reenforced depending on the condition of the base. On the upper level 11 and also the area served by the crane 37 is a pit 43, a cleaning plant 44 comprising essentially one or more tumbler barrels 45, and tracks 46 which lead to a stock house or to the charging side of the open hearth plant 12 and also to the stock house or charging side of the blast furnace 47 if the plant includes such furnace.

In operating the specific plant outlined above the slag and refuse of the dump is separated from the dump proper normally by the shovel 35 and deposited on the grizzly 18 as explained above. If, however, pieces too large to be handled by the shovel are encountered such pieces are lanced with oxygen and dynamited in order to break them down into pieces of handable size. The larger pieces which are obviously too big to pass through the grizzly 18 and that material which rolls off the grizzly down the chute 19 is conveyed by truck, or pushed by tractor bulldozer, or otherwise carried onto the platform 41 where it is broken by the skull cracker 48 operated by the lifting magnet 39 in a manner well understood in the art. The material so broken is magnetically separated by the lifting magnet 39, the pieces adhering to the magnet being deposited directly in the cleaning machine 44 on the upper level 11.

Of the material which passes through the grizzly 18 and is acted on by the magnetic separating drum 25, the component to be discarded issues from the chute 27 and is disposed of in the manner outlined above or by means of a tractor bulldozer to reform the dump. The steel bearing fines issuing from the chute 34 of the separator assembly are preferably loaded in a motor truck which transports the same to a railway car for delivery to the blast furnace. These fines which are smaller than 1 or 1½ inches in size are found to contain between 50 and 60% of steel and as such constitute a valuable charging material for the blast furnace. The substantial proportion of slag is not detrimental as the slag aids in the formation of the flux in the furnace.

The larger sized pieces of steel and pieces of slag containing steel which issue from the chute 31 of the separator are gathered in trucks or containers and subsequently transported to below the crane 37, being deposited either on the platform 41 or in the pit 42 from where they are lifted by the magnet 39 and deposited in the tumbler drum or drums 45. From the cleaning assembly 44 this material is deposited in the pit 43. The lifting magnet 39 is then utilized to separate the cleaned steel from the broken off slag and refuse in the pit 43 and the magnet loads the steel directly in the cars 49 which subsequently moves the steel to the stock house of the open hearth plant. From time to time bucket 40 is adapted to the crane 37 to remove the slag and debris from the pit 43.

It should now be apparent that I have provided a method and plant for recovering scrap steel from deposits and current sources of steel-making furnace slag and refuse which accomplishes the objects initially set out. The method and plant of my invention provides a practical and economically sound system for effecting this reclamation work at a substantial number of steel plants in the United States where the proportion of steel in the material to be processed warrants the operation of the recovery method and plants. Heretofore the steel discarded along with the slag and refuse was considered as total waste and since this steel represented between two and four percent of the total open hearth and Bessemer production, the waste was a serious economic loss. By the use of my methods and plant arrangements it is possible to recover up to ninety-five percent of the steel intermingled and entrapped in the slag and refuse material processed.

The above specifically illustrated and described embodiment of the invention may be substantially altered to meet widely varying local conditions without departing from the spirit or scope of the invention. If, for example, the process is to be applied to current production sources of slag and refuse, the separator (15) would be positioned on the same level as the tracks leading from the steel mill. Although the yield in current production operations is less than in the case of dump operations, the reclaimed steel is of more value to the steel mill since its analysis is generally known.

It is also contemplated that instead of grading the material after the initial magnetic separation, the material may be separated according to size before the initial magnetic separation and in this case two magnetic separating drums may be employed—one especially designed to handle the fines and the other constructed to take the heavier pieces. Some increase in operational efficiency may be expected from this modification. Also in the illustrated plant some decrease in material handling may be effected by employing a crawler crane equipped with a lifting magnet which at short intervals is passed over the material rejected by the grid 18 of the separator. The slag left at this point is disposed of as outlined above while the steel is subsequently cleaned and loaded onto the scrap cars.

In view of the above, reference should be had to the appended claims in determining the scope of the invention.

What I claim is:

1. The method of operating a steel-making plant having an open hearth furnace and a blast furnace which consists of subjecting the slag refuse of the open hearth furnace to a magnetic separation for the purpose of segregating the slag lumps or particles which contain an appreciable amount of free steel embedded therein, grading the last mentioned material into components having particle sizes greater and less than approximately 1", charging the finer material into the blast furnace, subjecting the coarser component to an impact treatment for the purpose of breaking away the slag from the steel particles, magnetically reseparating the material so treated, and charging the cleaned and separated steel into the open hearth furnace.

2. The method of operating a steel-making plant having steel-making furnaces including an open hearth furnace and a blast furnace which consists of subjecting the slag refuse of certain of the furnaces to a magnetic separation for the purpose of segregating the slag lumps or particles which contain an appreciable amount of free steel embedded therein, separating the last mentioned material according to size, charging the finer material into the blast furnace, subjecting the coarser material to an impact treatment for the purpose of breaking away the slag from the steel particles, magnetically reseparating the material so treated into slag and steel components, and charging the cleaned and separated steel into the open hearth furnace.

3. The method of operating a steel-making plant having steel-making furnaces including an open hearth furnace and a blast furnace which consists of subjecting the slag refuse of certain of the furnaces to a magnetic separation for the purpose of segregating the slag lumps or particles which contain an appreciable amount of free steel embedded therein, separating the last mentioned material according to size, charging the finer material into the blast furnace, cleaning the coarser material to remove the slag from the steel particles, and charging the cleaned and separated steel into the open hearth furnace.

4. The herein described method of operating a steel-making plant which consists of subjecting the slag refuse of steel-making furnaces to a magnetic separation for the purpose of segregating from the bulk of the material steel scrap pieces and slag lumps or particles which contain an appreciable amount of free steel embedded therein whereby fines suitable for charging in a blast furnace may be made available, separating the incrusted slag from the coarser lumps or particles which contain an appreciable amount of free steel whereby pieces of steel suitable for charging in a steel making furnace may be made available, and charging the last mentioned pieces of steel into a steel making furnace.

5. The herein described method of operating a steel-making plant which consists of subjecting the slag refuse of steel-making furnaces to a magnetic separation for the purpose of segregating from the bulk of the material steel scrap pieces and slag lumps or particles which contain an appreciable amount of free steel embedded therein whereby fines suitable for charging in a blast furnace may be made available, charging said fines into a blast furnace, and separating the incrusted slag from the coarser lumps or particles which contain an appreciable amount of free steel whereby pieces of steel suitable for charging in an open hearth furnace may be made available.

ERIC H. HECKETT.